United States Patent [19]
Brindley et al.

[11] Patent Number: 5,116,690
[45] Date of Patent: May 26, 1992

[54] OXIDATION RESISTANT COATING FOR TITANIUM ALLOYS AND TITANIUM ALLOY MATRIX COMPOSITES

[75] Inventors: William J. Brindley; James L. Smialek, both of Strongsville; Carl J. Rouge, Cleveland, all of Ohio

[73] Assignee: The United States of America as represented by the Administrator of the National Aeronautics and Space Administration, Washington, D.C.

[21] Appl. No.: 682,160

[22] Filed: Apr. 1, 1991

[51] Int. Cl.$^5$ .................. B32B 5/02; B32B 15/01; B32B 15/20
[52] U.S. Cl. .................. 428/614; 428/660; 428/661
[58] Field of Search ............... 428/614, 615, 660, 661, 428/651, 656

[56] References Cited

U.S. PATENT DOCUMENTS

| | | | |
|---|---|---|---|
| Re. 32,121 | 4/1986 | Gupta et al. | 428/656 |
| 4,419,416 | 12/1983 | Gupta et al. | 428/656 |
| 4,758,480 | 7/1988 | Hecht et al. | 428/682 |
| 4,786,566 | 11/1988 | Siemers | 428/568 |
| 4,801,513 | 7/1989 | Duhl et al. | 428/628 |
| 4,904,546 | 2/1990 | Jackson | 428/661 |
| 4,933,239 | 6/1990 | Olson et al. | 428/557 |

OTHER PUBLICATIONS

INCO, "High Temperature High Strength Nickel Base Alloys", 1984, pp. 4 and 16.

Primary Examiner—Michael Lewis
Assistant Examiner—Valerie Lund
Attorney, Agent, or Firm—Gene E. Shook; James A. Mackin; Guy M. Miller

[57] ABSTRACT

An oxidation resistant coating for titanium alloys and titanium alloy matrix composites comprises an MCrAlX material. M is a metal selected from nickel, cobalt, and iron. X is an active element selected from Y, Yb, Zr and Hf.

6 Claims, 2 Drawing Sheets

100 μm

100 μm

OXIDATION RESISTANT COATING FOR TITANIUM ALLOYS AND TITANIUM ALLOY MATRIX COMPOSITES

ORIGIN OF THE INVENTION

The invention described herein was made by employees of the United States Government and may be manufactured and used by or for the Government for governmental purposes without the payment of any royalties thereon or therefor.

TECHNICAL FIELD

This invention is concerned with coatings for titanium alloys and titanium alloy matrix composites. The invention is particularly directed to a practical and effective oxidation resistant coating for these materials.

Overlay coatings have been developed for superalloy components, but these coatings have not been applied to titanium alloys or titanium alloy matrix composites. While some titanium alloys have acceptable oxidation resistance, this oxidation resistance usually comes at the cost of desirable mechanical properties.

Research into oxidation resistant coatings for titanium-based alloys is a very recent field of endeavor. Intermetallic alloys of titanium typically have higher specific strengths than current superalloys and are therefore attractive candidates for structural materials in aerospace applications. However, many titanium alloys oxidize rapidly at the desired use temperatures, with a consequent deterioration of material properties. Therefore, there is an intense need for coatings that can inhibit deleterious oxidation without compromising the base material properties.

MCrAlY overlay coatings have been developed for oxidation protection of superalloy components in aircraft gas turbines but have not been investigated for use on titanium alloys or titanium-alloy-matrix composites.

It is, therefore, an object of the present invention to provide oxidation protection for titanium alloys and titanium-alloy-matrix composites without sacrificing desirable mechanical properties.

A further object of the invention is to provide a practical and effective oxidation resistant coating for titanium alloys and titanium-alloy-matrix composites.

BACKGROUND ART

Gupta et al U.S. Pat. No. 4,419,416 is concerned with an MCrAlY type overlay coating wherein M is nickel, cobalt, or mixtures thereof. In addition, the coating contains silicon and hafnium. The substrate may contain nickel, cobalt, tungsten, titanium, tantalum, aluminum and chromium.

U.S. Pat. No. 4,758,480 to Hecht et al is directed to protective coatings whose compositions are based on the compositions of the substrate. The coating comprises aluminum, chromium, hafnium, tantalum, yttrium and nickel while the substrate comprises nickel, aluminum, titanium, chromium and cobalt.

U.S. Pat. No. 4,801,513 to Duhl et al discloses a protective coating with an MCrAlY composition. The coating is applied to substrates including nickel, cobalt, aluminum, titanium, tantalum, tungsten and chromium.

U.S. Pat. No. 4,933,239 to Olson et al describes a protective NiCoCrAlY coating system which can be applied to a nickel base alloy. A diffusion zone may be included, and this zone is located between the substrate and an outer zone which contains the protective coating.

DISCLOSURE OF THE INVENTION

A practical and effective oxidation resistant coating constructed in accordance with the present invention comprises MCrAlX where M is nickel, cobalt, iron or combinations thereof and X is an active element, such as Y,Yb,Zr, or Hf. This oxidation resistant coating is applied to titanium alloys and titanium-alloy-matrix composites.

The advantage of this invention is good adhesion of the coatings without cracking, as compared to pack cementation or ceramic coatings that have been reported for these materials. One novel feature of this coated structure is the use of MCrAlX materials on titanium-alloy-matrix composites. While MCrAlX coatings are known in the prior art they have not been applied to titanium alloys and titanium-alloy-matrix composites.

BRIEF DESCRIPTION OF THE DRAWINGS

The objects, advantages and novel features of the invention will be more fully apparent from the following detailed description when read in connection with the accompanying drawings wherein.

BEST MODE FOR CARRYING OUT THE INVENTION

Figure 1:
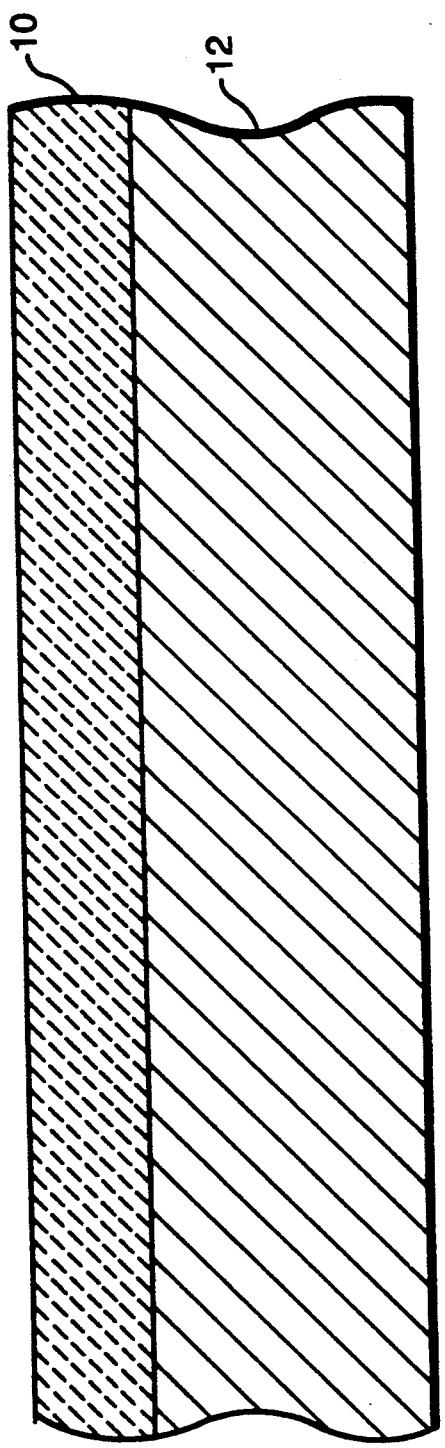
FIG. 1 is an enlarged vertical section view of a substrate coated in accordance with the present invention.

Referring now to the drawings there is shown in FIG. 1 an oxidation resistant coating 10 of the present invention. The coating is thermal sprayed and comprises a proven oxidation resistant metal, such as MCrAlX, where the "M" stands for Ni, Co, Fe or combinations thereof and X is an active element such as Y, Yb, Zr or Hf.

The coating 10 is applied to a substrate 12 as shown in FIG. 1. $Ti_3Al+Nb$ and $SiC/Ti_3Al+Nb$ composite materials were used for the substrate 12 where SiC is the fiber used in the composite and $Ti_3Al+Nb$ is the matrix.

Figure 2:
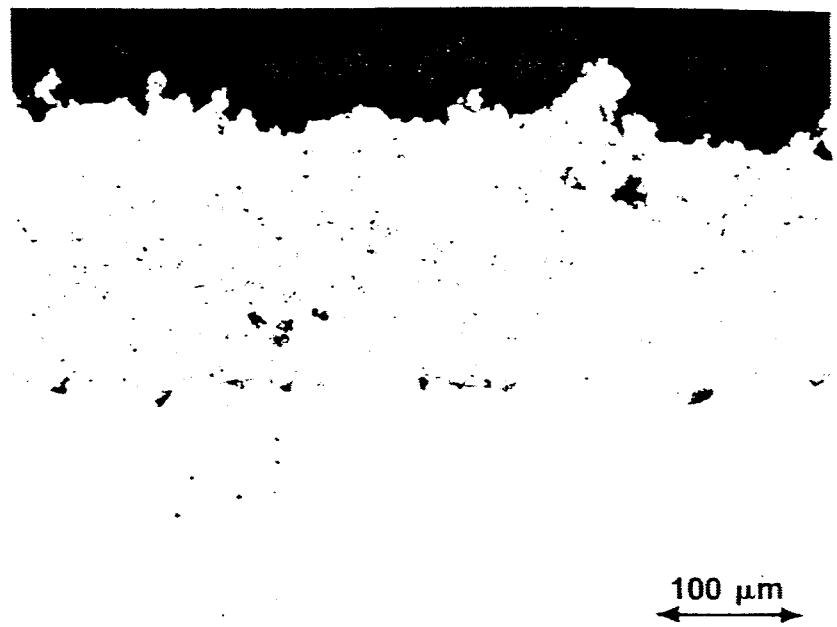
FIG. 2 is an enlarged photomicrograph of a titanium alloy coated in accordance with the present invention.
Figure 3:
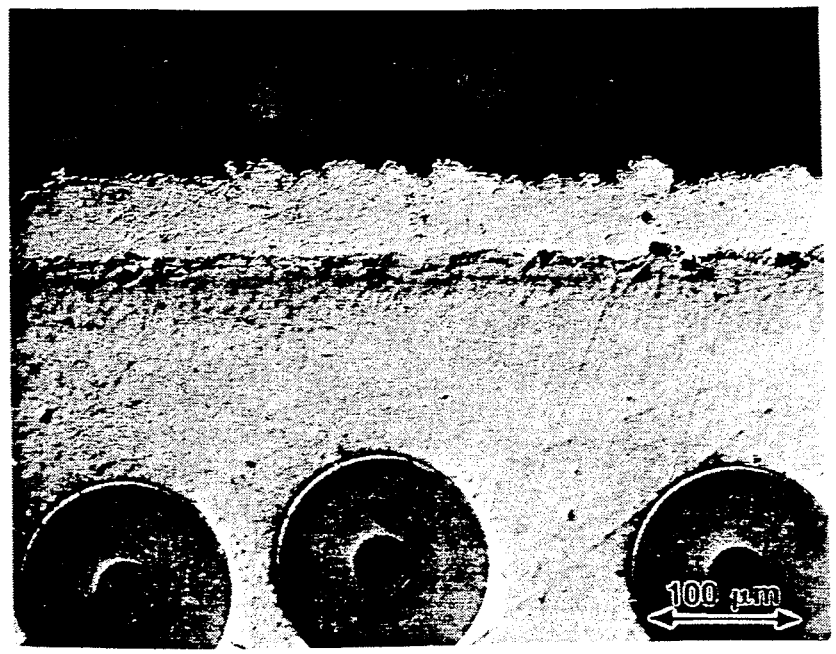
FIG. 3 is an enlarged photomicrograph of a titanium-alloy-matrix composite coated in accordance with the present invention.

NiCrAlY coatings 0.002 in. to 0.010 in. thick, with compositions of Ni-(12–38)wt %Cr-(6–12)wt %Al-(0.3–0.95)wt %Y, were applied on the major surfaces of coupons of $Ti_3Al+Nb$ and $SiC/Ti_3Al+Nb$ composite materials as shown in FIGS. 2 and 3. More particularly, FIG. 2 is an optical micrograph of a cross section of an as-plasma sprayed Ni-35 Cr-6Al-0.95Y coating on a $Ti_3Al+Nb$ substrate. FIG. 3 is an optical micrograph of an as-plasma sprayed Ni-35Cr-6Al-0.95Y coating on a $SiC/Ti_3Al+Nb$ composite substrate.

−325 mesh +5 μm NiCrAlY powders were low pressure plasma sprayed at a chamber pressure of 30–40 torr directly onto the surface of the substrate 12. Trial coatings where thermal cycle tested in cycles of 1 hour at 982° C. and cooling to 150° C. The coatings remained adherent through 100 cycles. The Ni-35Cr-6Al-0.95Y and Ni-18Cr-12Al0.3Y coatings exhibited some minor cracking after 100 cycles, but the Ni-16Cr-6Al-0.3Y coating had no apparent cracking on the major surfaces after 100 cycles. The oxidative weight gains of these coupons were not determined because the coupons were not coated on the edges or ends.

While several preferred embodiments of the invention have been disclosed and described, it is contemplated that various modifications may be made to the invention without departing from the spirit of the invention or the scope of the subjoined claims. By way of example, a variety of thermal spray processes, such as arc spray and flame spray, as well as various thermal spray parameters, may be made to achieve an oxidation resistant overlay coating as described.

We claim:

1. A coated article of manufacture comprising
a substrate of a material consisting of Ti$_3$Al+Nb titanium alloys alone or as a matrix of a composite comprising SiC fiber in the Ti$_3$Al+Nb material, said substrate having a surface that is exposed to an oxidizing environment, and
a thermal sprayed oxidation resistant metal coating of NiCrAlY adhered to said surface of said substrate, said coating being substantially crack free.

2. A coated article of manufacture as claimed in claim 1 wherein the coating contains about 12 w/o to 38 w/o chromium, about 6 w/o to 15 w/o aluminum, about 0.1 w/o to 1.2 w/o yttrium, and the remainder nickel.

3. A coated article of manufacture as claimed in claim 2 wherein the coating has a thickness of about 0.002 inch to about 0.010 inch.

4. A coated article of manufacture as claimed in claim 2 wherein the coating contains about 35 w/o Cr, about 6 w/o Al, about 0.95 w/o Y and the remainder nickel.

5. A coated article of manufacture as claimed in claim 2 wherein the coating contains about 18 w/o Cr, about 12 w/o Al, about 0.3 w/o Y and the remainder nickel.

6. A coated article of manufacture as claimed in claim 2 wherein the coating contains about 16 w/o Cr, about 6 w/o Al, about 0.3 w/o Y and the remainder nickel.

* * * * *